UNITED STATES PATENT OFFICE.

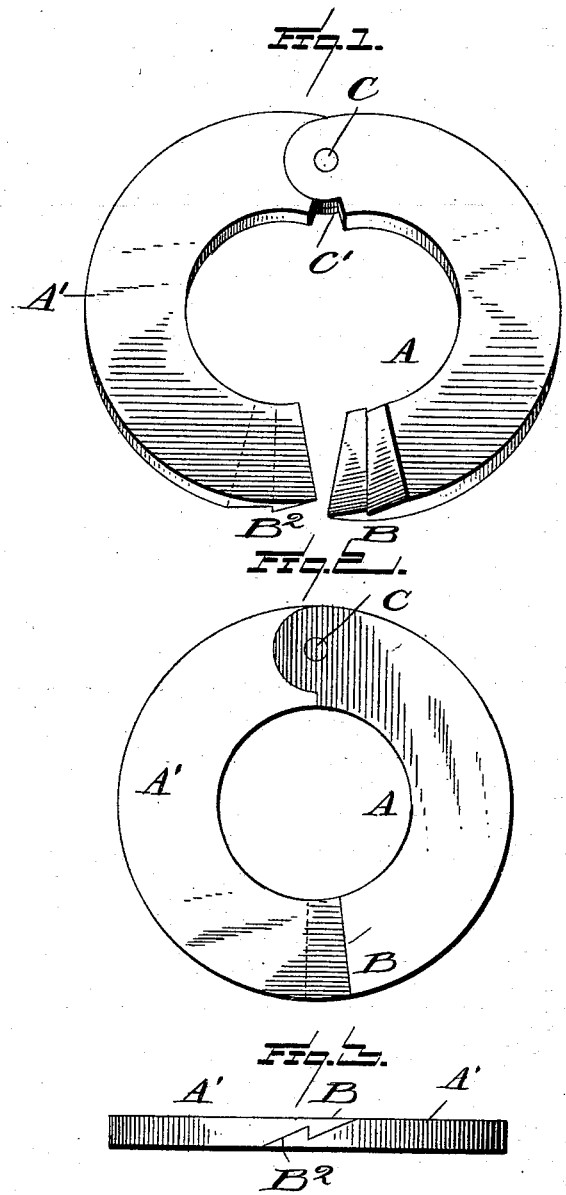

JOHN HEMPHILL, OF AUGUSTA, MISSISSIPPI.

SPLIT HINGED METALLIC WASHER.

SPECIFICATION forming part of Letters Patent No. 648,562, dated May 1, 1900.

Application filed September 6, 1899. Serial No. 729,632. (No model.)

*To all whom it may concern:*

Be it known that I, JOHN HEMPHILL, a citizen of the United States, residing at Augusta, in the county of Perry and State of Mississippi, have invented certain new and useful Improvements in Split Hinged Metallic Washers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in washers to be applied to bolts, and it has particular reference to the provision of such a washer having separable end portions adapted to be secured together.

The invention has for one object the production of a washer which can be placed upon or removed from a bolt without the necessity of removing the binding-nut therefrom or removing any other body through which the bolt passes.

A further object of the invention is to provide an improved construction of separable sections and a locking device whereby the washer may be applied and its members secured together to form a continuous washer.

To these ends and to such others as the invention may pertain the same consists in the novel construction and in the peculiar combination, arrangement, and adaptation of parts, all as more fully hereinafter described, shown in the accompanying drawings, and then specifically defined in the appended claim.

The invention is clearly illustrated in the accompanying drawings, which, with the letters of reference marked thereon, form a part of this specification, like letters of reference indicating the same parts throughout the several views, and in which drawings—

Figure 1 is a perspective view of the washer. Fig. 2 is an edge view showing the pivoted joint. Fig. 3 is a similar view illustrating the form of locking device for the separable members of the washer.

Reference now being had to the details of the drawings by letter, A designates a washer, which may be of metal or any other suitable material. The washer is provided with separable portions A', which in the present illustration are shown as having beveled or inclined overlapping ends B. These ends may be provided with any desired locking means—such, for instance, as the projection B', adapted to engage the recess behind a corresponding projection $B^2$ upon the opposing member. When the locking device is engaged, the end portions will be held against separation.

To permit the washer to be applied to a bolt without removing the nut, the washer may be composed of members pivoted together, as at C, and, if desired, may be formed with opposite reduced pivoting-lugs C', which permit the washer to be of a uniform thickness. This structure of washer can also be quickly removed from a bolt without removing the binding-nut therefrom.

The washer herein described can be readily applied to a bolt by simply loosening the binding-nut and separating the ends of the washer to permit the same to be passed over the bolt. The ends are then locked together and will be additionally secured by the pressure of the nut thereon. The washer can likewise be applied between plates or timbers, if desired, without removing the bolt from the apertures through the same.

It will be at once obvious that changes may be made in the details of construction and in the configuration of the several parts without departing from the spirit of the invention as defined by the claim.

Having thus described my invention, what I claim to be new, and desire to secure by Letters Patent, is—

A washer made up of two semicircular pieces pivoted together with their faces in parallel planes and designed to encircle an imperforate shaft, the opposite broad faces, near the free ends of said pieces, each having two beveled faces, the inner ends of the latter terminating in a shoulder at right angles to the faces of the washer, each of said beveled faces tapering slightly toward the pivotal point of the two pieces, substantially as shown and described.

In testimony whereof I affix my signature in presence of two witnesses.

JOHN HEMPHILL.

Witnesses:
C. C. DEARMAN,
F. F. HINTON.